United States Patent [19]

Lare

[11] Patent Number: 5,193,629
[45] Date of Patent: Mar. 16, 1993

[54] METHOD AND APPARATUS FOR DETERMINING THE NUMBER AND/OR VALUE OF WEIGHED ITEMS

[75] Inventor: Christopher Lare, Bridgend, United Kingdom

[73] Assignee: Percell Group Limited, Gwent, England

[21] Appl. No.: 623,441

[22] PCT Filed: Jun. 7, 1989

[86] PCT No.: PCT/GB89/00630
§ 371 Date: Jan. 16, 1991
§ 102(e) Date: Jan. 16, 1991

[87] PCT Pub. No.: WO89/12217
PCT Pub. Date: Dec. 14, 1989

[30] Foreign Application Priority Data

Jun. 7, 1988 [GB] United Kingdom ............ 8813399

[51] Int. Cl.$^5$ ........................................... G01G 19/42
[52] U.S. Cl. ............................ 177/25.17; 177/200
[58] Field of Search ........................ 177/25.17, 200

[56] References Cited

U.S. PATENT DOCUMENTS

| | | | |
|---|---|---|---|
| 4,157,738 | 6/1979 | Nishiguchi et al. | 177/200 X |
| 4,447,885 | 5/1984 | Biss | 177/25.17 |
| 4,493,384 | 1/1985 | Yano et al. | 177/200 X |
| 4,512,428 | 4/1985 | Bullivant | 177/25.17 |
| 4,629,016 | 12/1986 | Knothe et al. | 177/200 X |
| 4,646,767 | 3/1987 | Hikita | 177/200 X |
| 4,674,060 | 6/1987 | Larkin et al. | 177/25.17 X |
| 4,685,525 | 8/1987 | Knothe et al. | 177/25.17 |

FOREIGN PATENT DOCUMENTS

| | | |
|---|---|---|
| 0040539 | 11/1981 | European Pat. Off. . |
| 0124976 | 11/1984 | European Pat. Off. . |
| 0091274 | 6/1985 | European Pat. Off. . |
| 60-18725 | 1/1985 | Japan . |
| 1517221 | 7/1978 | United Kingdom . |
| 1517231 | 7/1978 | United Kingdom . |
| 2027914 | 2/1980 | United Kingdom . |
| WO8809485 | 12/1988 | United Kingdom . |

OTHER PUBLICATIONS

WO, A,88/09485 (Percell Group Ltd.), Dec. 1, 1988, see p. 2, line 8-p. 7, line 1; FIGS. 1–5C cited in the application.

Primary Examiner—George H. Miller, Jr.
Attorney, Agent, or Firm—Cushman, Darby & Cushman

[57] ABSTRACT

Weighing apparatus for weighing currency notes or coins has a weighing platform (4) coupled to a load cell (14) for generating a weight signal dependent upon the weight of items on the platform. The weighing machine includes a microprocessor (26) with associated memory (32, 34) which determines the number and/or value of the weighed items by dividing the weight signal by an appropriate weight factor. Where the quotient obtained is not an exact integer it is rounded. The quotient is compared with tolerance limits and a warning is given if the quotient falls outside these limits. To increase the accuracy of the machine whilst maintaining or reducing the number of warnings, means are provided to vary said tolerance limits in accordance with said weight signal or with said quotient.

38 Claims, 9 Drawing Sheets

METHOD AND APPARATUS FOR DETERMINING THE NUMBER AND/OR VALUE OF WEIGHED ITEMS

The present invention relates to a method and apparatus for determining the number and/or value of weighed items.

Counting machines for determining the number and/or value of coins or bank notes by weighing are known. For example, European Patent No. 0040539 describes such a machine which determines the number and/or value of the weighed items by dividing a total weight signal by an appropriate weight factor. Where the quotient obtained is not an exact integer, the quotient is rounded to the nearest exact integer.

It is important that the machine only displays accurate and reliable results, and accordingly the European Patent describes how the machine can be arranged to display a warning if a reliable number and/or value cannot be given. In this respect, the quotient obtained is compared with predetermined tolerance limits and a warning is given if the quotient falls outside these limits.

The tolerance limits are usually chosen to represent a balance between absolute accuracy and minimising the number of warnings. Of course, this means that errors may be made or that warnings of errors will be given where an accurate count could be made. This can be annoying to the operator and it is preferable that the number of unnecessary warnings is kept to a minimum whilst maximising the count accuracy.

The present invention seeks to provide a method and apparatus for determining the number and/or value of weighed items, and associated verifying apparatus, in which accuracy has been increased whilst the number of warnings has been maintained or reduced.

According to a first aspect of the present invention there is provided apparatus for determining the number and/or value of weighed items comprising processor means arranged to receive a weight signal representative of the weight of weighed items, said processor means having means for forming a quotient comprising means for dividing said weight signal by a selected preset value, and means for comparing said quotient with tolerance limits, and output means for signalling that said quotient is within said tolerance limits and so acceptable or that said quotient is outside said tolerance limits and so unacceptable, wherein said verifying apparatus further comprises means arranged to vary said tolerance limits in accordance with predetermined parameters.

In an embodiment said predetermined parameters are said weight signal, said quotient or a function of said weight signal and said quotient.

Preferably, said means to vary said tolerance limits is arranged to vary said tolerance limits in dependence upon said quotient.

The selected preset value by which said weight signal is divided may be, for example, a value representative of the number of individual items in a weighed article such that an acceptable quotient is representative of the weight of one or more of the individual items. However, preferably, said selected preset value is a respective one of a plurality of preset weights such that an acceptable quotient is representative of the number of items in a weighed article.

Said means for forming a quotient may further comprise means for subtracting a preselected value from the results of the division of the weight signal by the selected preset value to form the quotient to be compared with said tolerance limits. In an embodiment, said subtracting means is arranged to subtract a preselected value representative of a previous number of items in a weighed article from the results of the division such that said quotient is representative only of the number of subsequently added items.

Preferably, said means arranged to vary said tolerance limits is arranged to increase the area of the tolerance limits in which the quotient is unacceptable as the value of the said quotient is increased. Said means arranged to vary said tolerance levels may be arranged to determine the tolerance limits in dependence upon the value of the integer of said quotient, and wherein said means for comparing is arranged to compare the fraction of the quotient with the determined tolerance limits.

Any quotient can be expressed as an integer and a fraction, and in a preferred embodiment the said tolerance limits are determined by the value of the integer and then the fraction of the quotient is compared with said determined tolerance limits.

In an embodiment, said apparatus further comprises means for comparing said quotient with a predetermined quantity, said output means being arranged to signal a warning if said quotient exceeds said predetermined quantity.

The present invention also extends to a weighing apparatus for determining the number and/or value of weighed items, said apparatus comprising means for producing a weight signal, and apparatus as defined above arranged to receive said weight signal, wherein means are provided for determining the number and/or value of the weighed items from an acceptable quotient.

Preferably, said means for producing the weight signal comprises weighing means for producing an actual measured weight.

Means may be provided for deducting a tare value from an actual measured weight to derive the said weight signal.

In an embodiment arranged to weigh items of different denominations, each denomination representing a different value, said weighing apparatus comprises storage means in which a list of denominations is stored together with the value assigned to each denomination, and a respective preset value for each denomination in said list.

Preferably, the preset value stored in said storage means for each denomination in said list is representative of the weight of a respective predetermined number of the items of that denomination. For example, the preset value stored in said storage means for each denomination in said list is representative of the weight of an individual one of the items of that denomination.

Said stored preset values are preferably preset weights such that said quotient formed by said processor means is representative of the number of items being weighed. In this case, said processor means is arranged to be responsive to said output means signalling that said quotient is acceptable to enable multiplying means to multiply at least part of said quotient by the value assigned to said denomination whereby the value of the weighed items is determined. When said quotient is acceptable an appropriate exact integer value therefor is formed, and it is said exact integer value which is multiplied by said multiplying means with said assigned value.

Preferably, the apparatus is for counting coins or notes and each preset value corresponds to the weight of a respective number of coins or notes of a respective denomination.

In an embodiment, if said quotient is acceptable an appropriate exact integer value therefor is formed.

This exact integer value is then utilised to derive signals indicating the number of weighed items and/or their aggregate value.

According to a further aspect of the present invention there is provided a method of determining the number and/or value of weighed items, the method comprising the steps of forming a quotient by steps including dividing a weight signal representative of the weight of weighed items by a selected preset value, comparing said quotient with tolerance limits, and signalling the quotient as acceptable if it is within said tolerance limits and as unacceptable if it is outside said tolerance limits, wherein said tolerance limits are varied in dependence upon predetermined parameters.

In an embodiment said predetermined parameters are said weight signal, said quotient, or a function of said weight signal and said quotient.

Preferably, said selected preset value represents the weight of one item of a respective denomination such that an acceptable quotient is representative of the number of items of that denomination being weighed.

In an embodiment, the method further comprises the steps of weighing the items to produce an actual measured weight, and deriving said weight signal from said actual measured weight, storing a list of denominations of items, storing for each denomination of item a respective preset weight and a respective assigned value, and further comprising the step of forming said quotient and determining if it is acceptable, and if said quotient is acceptable, determining from said quotient and said assigned value the value of said weighed items, and displaying the value of the items so determined.

Embodiments of the present invention will hereinafter be described, by way of example, with reference to the accompanying drawings, in which.

Figure 1:
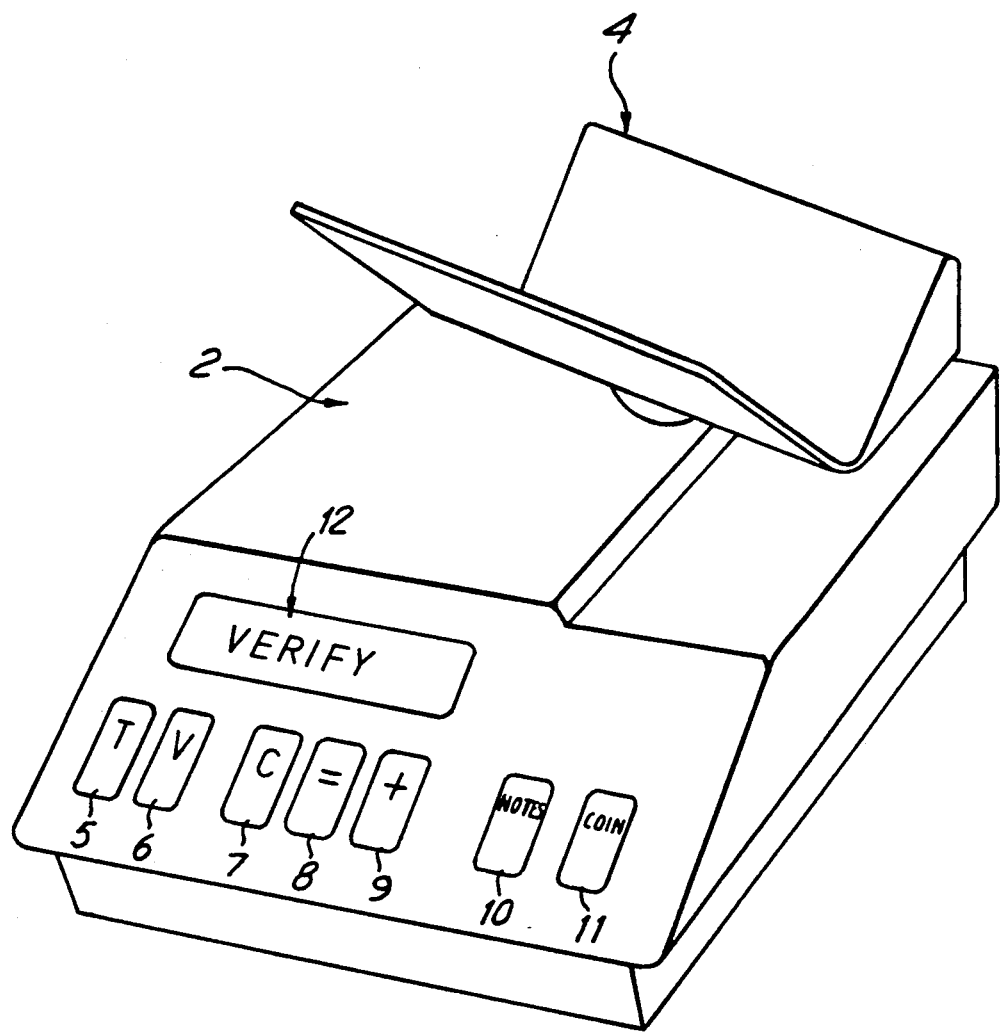
FIG. 1 shows a perspective view of weighing apparatus of the invention.

The drawings illustrate a weighing apparatus for determining the number and/or value of weighed items. The weighing apparatus described and illustrated herein is generally similar to that described and illustrated in our International Application No. PCT/GB88/00391 (WO 88/09485) but is modified, as will become apparent to increase accuracy whilst the number of warnings has been maintained or even reduced. The weighing apparatus, as is apparent from FIG. 1, is a stand alone weighing machine having a housing generally referenced 2 in which an electronic circuit including processing means and electronic storage is contained. A block diagram of the circuit of the machine is illustrated in FIG. 2.

As shown in FIG. 1 a weighing platform 4 for receiving items such as coins or notes whose number and/or value is to be determined is associated in known manner with an electronic precision weighing device for the provision of electrical output signals which are proportional to the weight applied to the weighing platform 4. A number of input keys 5 to 11 are provided in a panel of the housing 2 for inputting information to the processing unit. Furthermore, a display panel 12 for displaying appropriate messages under the control of the processing unit is also provided in a panel of the housing 2. Naturally, this display panel 12 may be constituted by appropriate display means.

Figure 2:
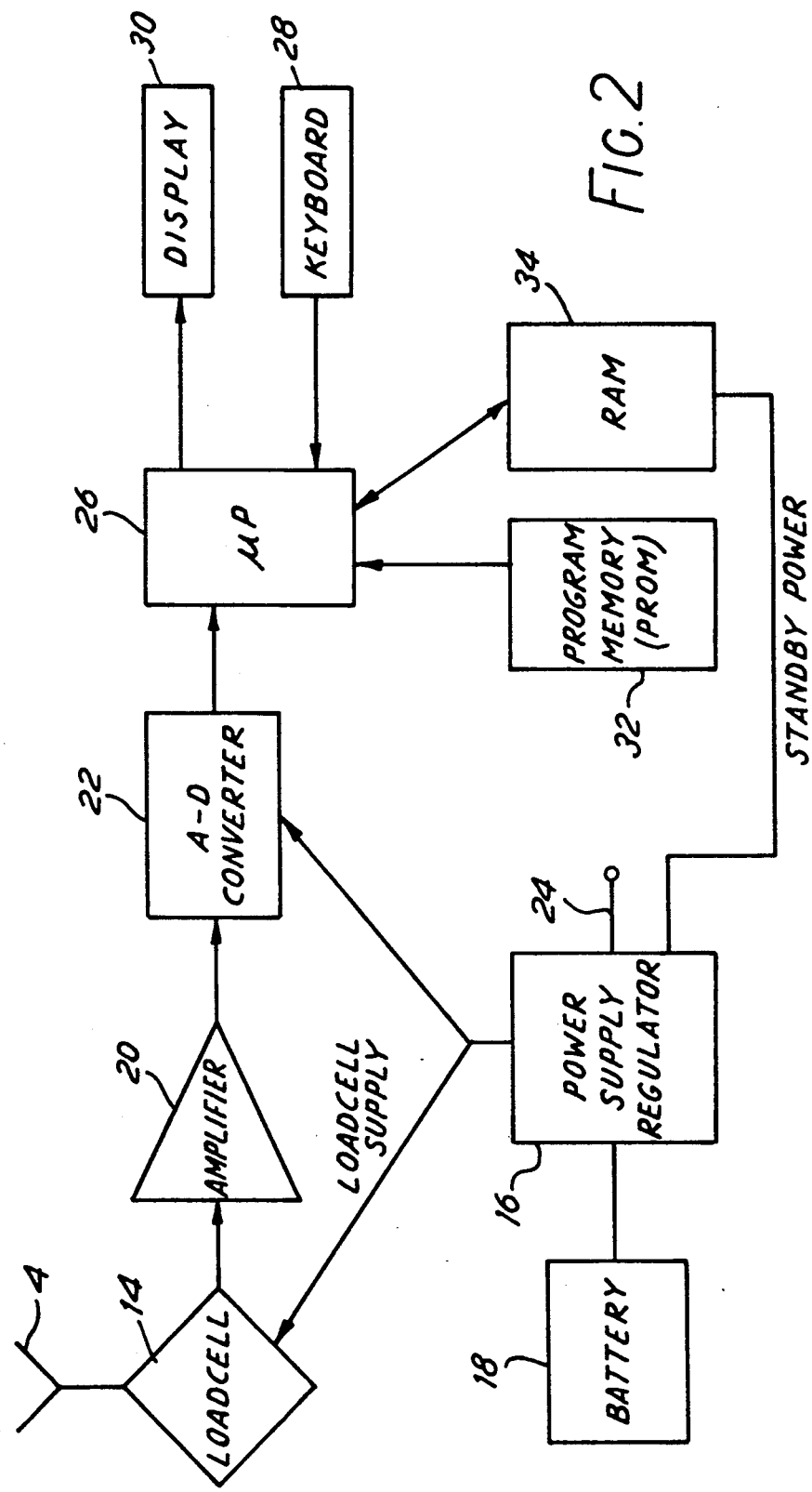
FIG. 2 shows a block circuit diagram of the apparatus of FIG. 1.

FIG. 2 shows a block circuit diagram of the electronic circuit of the machine received within the housing 2. The weighing platform 4 is associated with a load cell 14 of the electronic precision weighing device. This load cell 14 is supplied with a regulated power supply by way of a power supply regulator 16 connected across a battery 18. This load cell produces an electrical output signal whose magnitude depends upon the weight applied to the load cell by way of the weighing platform 4. This output signal is fed to an amplifier 20, and the amplified output signal is then applied to an analogue to digital converter 22. It will be seen that the analogue to digital converter 22 is also fed with a regulated power supply from the regulator 16. The power supply applied directly to the converter 22 acts as a reference so that the digital output signal from the converter 22 is generally independent of any fluctuations in power supply levels and therefore is substantially proportional to the weight applied to the load cell 14. In known manner, the power supplied to the electronic precision weighing device is isolated from the power supplied to the processing means to avoid problems with noise.

A further power output 24 of the regulator 16 is connected in known manner to provide power to a processing unit 26 and units associated therewith.

In the embodiment shown, the processing unit is a micro-processor 26 whose associated keyboard 28 is constituted by the keys 5 to 11. A display 30 of the micro-processor 26 is constituted by the display panel 12 together with appropriate display drivers and interface means (not shown). In the embodiment illustrated, the micro-processor 26 is connected both to a pre-programmed memory 32 which may be a read only memory (ROM) or a programmable read only memory (PROM), and to a memory 34 which is a random access memory (RAM). The pre-programmed memory 32 includes the programs for the micro-processor 26 as well as data relating to the items which the weighing machine is arranged to weigh.

The machine illustrated is particularly intended for weighing bank notes and/or coins and/or tokens or other counters representative of monetary value. The machine may be programmed to weigh the notes and coins of a single currency, or of several currencies. For simplicity, in the following description, we will consider the operation of the machine as a currency counter programmed to be responsive to the notes and coins of a single currency.

The information held in the memory 32 includes a list of the denominations of the notes and coins of the currency of interest. In addition, the memory 32 includes the monetary value of each denomination, and for each denomination holds the number of items which would be packaged in a standard pack together with the weight of the packaging of that standard pack. For each said standard pack the memory 32 is also provided with a preset tolerance given, for example, as the limits of the acceptable deviation from the standard number of items in each pack.

There is also stored within the memory 32 weight limits below which the weighing platform is deemed to be empty, and weight limits below which the weighing platform is deemed to be empty and zero tracking will occur.

The memory 32 also contains the weight of each denomination of the coins and notes. In addition for each denomination of notes, the memory contains the following information:

1. An Error Band Table providing predetermined error band limits for each note dependent upon the number of notes being counted.
2. The maximum number of each note which may be counted in any single operation.
3. The largest number of notes which may be placed on the scale pan before a warning message is displayed.

This information is utilised in error reducing techniques described hereinbelow. Of course, it would be possible to store the same information in respect of the coins of the currency. Generally, however, the weight of coins is very stable and they can be counted and/or valued very accurately simply by weighing and without any calibration or error reduction techniques being necessary.

The use of all of the information pre-programmed into the memory 32 will become apparent from a consideration of the program routines illustrated by the flow diagrams of FIGS. 3 to 6 which are described below.

It will be appreciated that the information in the memory 32 is generally programmed in the factory. However, the programming of the memory 32 is not within the scope of this invention and will not therefore be further described.

When the machine of FIG. 2 is switched on, the micro-processor 26 is programmed to initiate any initialisation routines. On first switch on, this involves the transfer of certain information from the memory 32 to the RAM 34. It will be seen that the RAM 34 is permanently supplied with standby power by way of the regulator 16 so that the RAM is not volatile. Generally, it is the information in the RAM 34 which is utilised by the micro-processor 26 in the performance of the programs. This enables the information stored in the RAM 34 to be updated as necessary. In addition, full calibration and partial recalibration programs, which are not described herein, may be provided to modify the information stored in the RAM 34.

When the machine of FIG. 2 is on, the micro-processor 26 runs its main program continuously. This program is the weighing routine shown in FIG. 3. In addition, the weighing device is arranged by way of micro-processor timing means to periodically supply a weight signal to the micro-processor 26. For example, a new weight reading can be supplied ten times a second.

The micro-processor 26 is also programmed to continuously run a keyboard read routine causing the state of the keys 5 to 11 of the keyboard 28 to be read periodically. This information as to key states is stored in appropriate locations of the RAM 34. For example, in a preferred embodiment, the keyboard is read once every four milliseconds and the keyboard map showing which keys are currently pressed is stored in RAM 34. In known manner, the keyboard read routine is provided with anti-bounce checks.

The provision of a suitable keyboard read routine and of a timing means for periodically supplying weight signals will be within the competence of anyone skilled in the art and so are not further described herein.

Figure 3:
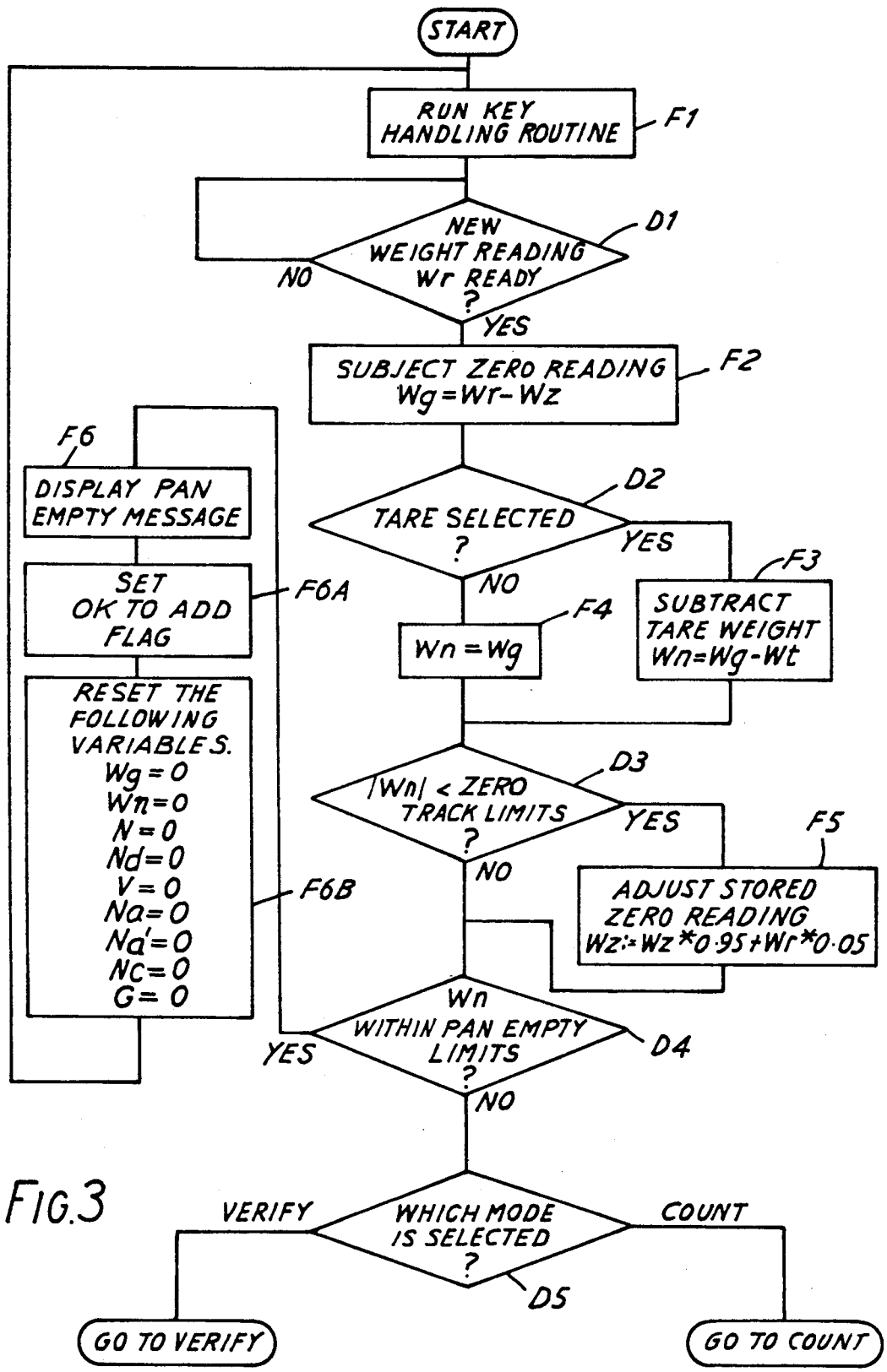
FIG. 3 shows a flow diagram of the main weighing routine performed by a processing unit of the weighing apparatus.

FIG. 3 shows the flow chart for the main weighing routine and it will be seen that the first action taken is the running of a key handling routine F1. This routine, which is illustrated in FIG. 6, looks at the keyboard map stored in RAM showing the state of the keys 5-11 and selects appropriate modes in accordance with the keys which have been pressed. Let us assume that initially no keys are pressed.

The exits of the key handling routine F1 return to the main routine of FIG. 3 which proceeds to determine if a new, filtered, weight reading has been received from the weighing device by way of the converter 22. In this respect, it will be recalled that weight readings are applied to the micro-processor 26 ten times a second. It will be clear from FIG. 3 that if the decision at block D1 is made when no new weight reading has arrived, the program will loop back to decision D1. If a filtered weight reading is received, that new weight reading will be stored in RAM 34 and the program will then move on to function F2. In this respect, the program at decision block D1 is arranged to determine not only that a new weight reading has been received, but also that the weight reading has settled and has been filtered to remove the effects of vibration. Thus, at the decision block D1 the program effectively waits for a new, steady and filtered weight reading Wr to be received.

Stored in RAM 34 is a pan empty reading Wz which is representative of the weight signal received when the weighing platform 4 is empty. At block F2 the gross weight Wg on the platform 4 is determined by subtracting the pan empty weight Wz from the current weight reading Wr that is, Wg=Wr−Wz. This determined gross weight Wg is stored in RAM.

The routine then moves on to the decision block D2 where it determines if tare has been selected by pressing the appropriate key 5, marked "T". This information will already have been stored in RAM by the key handling routine F1. If tare has been selected function block F3 subtracts from the gross weight Wg the tare weight Wt stored in RAM to form the nett weight Wn, that is $Wn = Wg - Wt.$ In this case, the key handling routine F1 will have already determined that none of the keys 5 to 11 has been pressed and accordingly the answer at the decision block D2 is "No". This leads the routine to block F4 in which the nett weight Wn is accorded the value of the gross weight Wg.

The nett weight Wn formed by either function F3 or F4, as appropriate, is then applied to decision block D3 where it is compared with zero track limits from the memory 32. These zero track limits give the readings below which the weighing platform is deemed to be empty. These zero track limits also set the readings below which adjustment of the stored pan empty reading occurs.

By way of example, let us assume that the stored pan empty reading Wz is 200. Let us also assume that the weighing platform 4 is empty and that the weight reading Wr received by the micro-processor 26 is 203. It will be apparent that the gross weight Wg computed by function F2 will be 3 and this will be assigned to the nett weight Wn by block F4. If the zero track limits are set say at 8, the nett weight Wn will be found by block D3 to be less than the limit. The "YES" answer at decision block D3 will therefore cause zero tracking to be performed by the function block F5.

In function block F5 a new pan empty reading Wz is computed from the original Wz reading and from the new weight reading Wr. The formula used is $$New\ Wz = Old\ Wz \times 0.95 + Wr \times 0.05.$$

It will be appreciated that this formula causes a gentle adjustment to the original value of Wz to be made because the new value of Wz is strongly based on the old value with only a 5% adjustment for the new weight reading Wr. In the example given the adjusted value which is assigned to Wz in RAM will be 200.15 as compared to the 200 originally assigned thereto. By this means it is ensured that the value of Wz only undergoes considerable alteration in response to a trend, and that it is not adversely effected by spurious readings.

The pan empty reading Wz having been adjusted by block F5, the program moves on to decision block D4 in which the nett weight Wn is compared with pan empty limits stored in ROM 32. These are the weight limits below which the weighing platform is deemed to be empty. In the example given, these limits might be set, say, at 15. In the example given, the nett weight Wn has been accorded the value 3 and therefore is well below the pan empty limits so that D4 gives a "YES" output. The routine has therefore correctly identified that the pan is empty and function block F6 thereby causes an appropriate pan empty message to be displayed by way of the display 30. Block F6A now sets an "OKTOADD" flag which is used later in the key handling routine at block D20, and block F6B resets to zero variables which are used in the COUNT routine of FIG. 5. At this point, as will be appreciated, the routine loops back to its start and thus can respond at F1 to any keys which have been pressed and at D1 to the receipt of a new weight reading.

If on running through the weighing routine of FIG. 3 it is found that a weight has been placed on the platform 4, it will be appreciated that the nett weight Wn computed at either F3 or F4 will be more than the zero track limits of D3 and the pan empty limits of D4. In this case then, instead of looping back to the start, the routine will continue to decision block D5 in which the program looks to see which mode has been selected. If the key 6 marked "V" has been pressed the verify mode will have been selected and the verify program of FIG. 4 will be run. Alternatively, if either of the keys 10 or 11, marked respectively "NOTES" and "COINS", have been pressed, the program will proceed to its count routine illustrated in FIG. 5.

Figure 4:
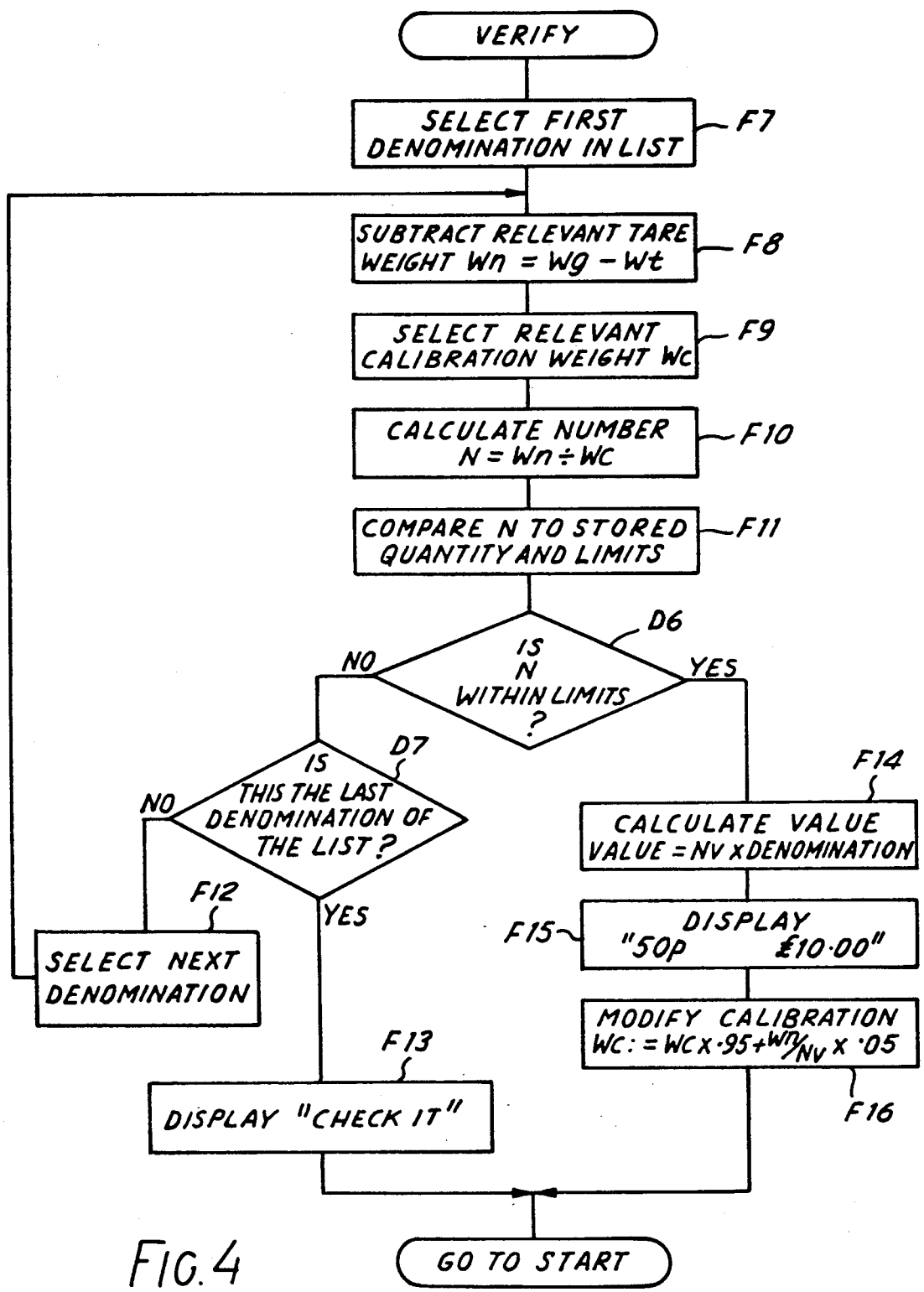
FIG. 4 shows a flow diagram of a verifying routine of the weighing apparatus.

FIG. 4 illustrates the verifying routine which enables automatic verifying of standard packs of notes or coins. Initiation of this routine is by pressing the key 6. With this key pressed, and the weighing platform 4 empty, the verify mode is selected by the key handling routine F1, and the function block F6 of the main program will cause the message "VERIFY" to be displayed by the display 12. Thereafter, the placing of a weight on the platform 4 will cause the machine automatically either to confirm the contents of the pack or to display a warning message "CHECK IT".

To perform the verify routine of FIG. 4, additional information is stored by the memory 32. This additional information comprises a list of the denominations of coins and notes which can be verified by the machine. For each of these denominations there is also stored a calibration weight Wc for that denomination, the number Nv of items of that denomination in a standard pack, and the tare weight Wt, that is, the weight of the packaging for that standard pack. If the coins or notes of any denomination are often packaged in more than one standard pack, that denomination may appear more than once in the list of denominations. Each entry for each denomination will, in this case be associated with data (Nv and Wt) relating to a respective standard pack.

The verifying routine is described and illustrated in International Application No. WO 88/09485, the contents of which are incorporated herein by reference. Accordingly, the details of the routine, which is illustrated in FIG. 4, will not be further described herein.

As is also made clear in International Application No. WO 88/09485, the machine is particularly useful in that the standard packs placed on the platform 4 for their verification, can simultaneously have their values added. Thus, at the end of a verification run, the operator will not only have checked the accuracy and integrity of the contents of a series of standard packs, but will also have an accurate total of their value. This addition is performed by the key handling routine of FIGS. 6A, 6B and 6C which is initiated by function F1 of the main program. Again, the key handling routine is described in detail in International Application No. WO 88/09485 and so is not further described in detail herein.

Figure 5A:
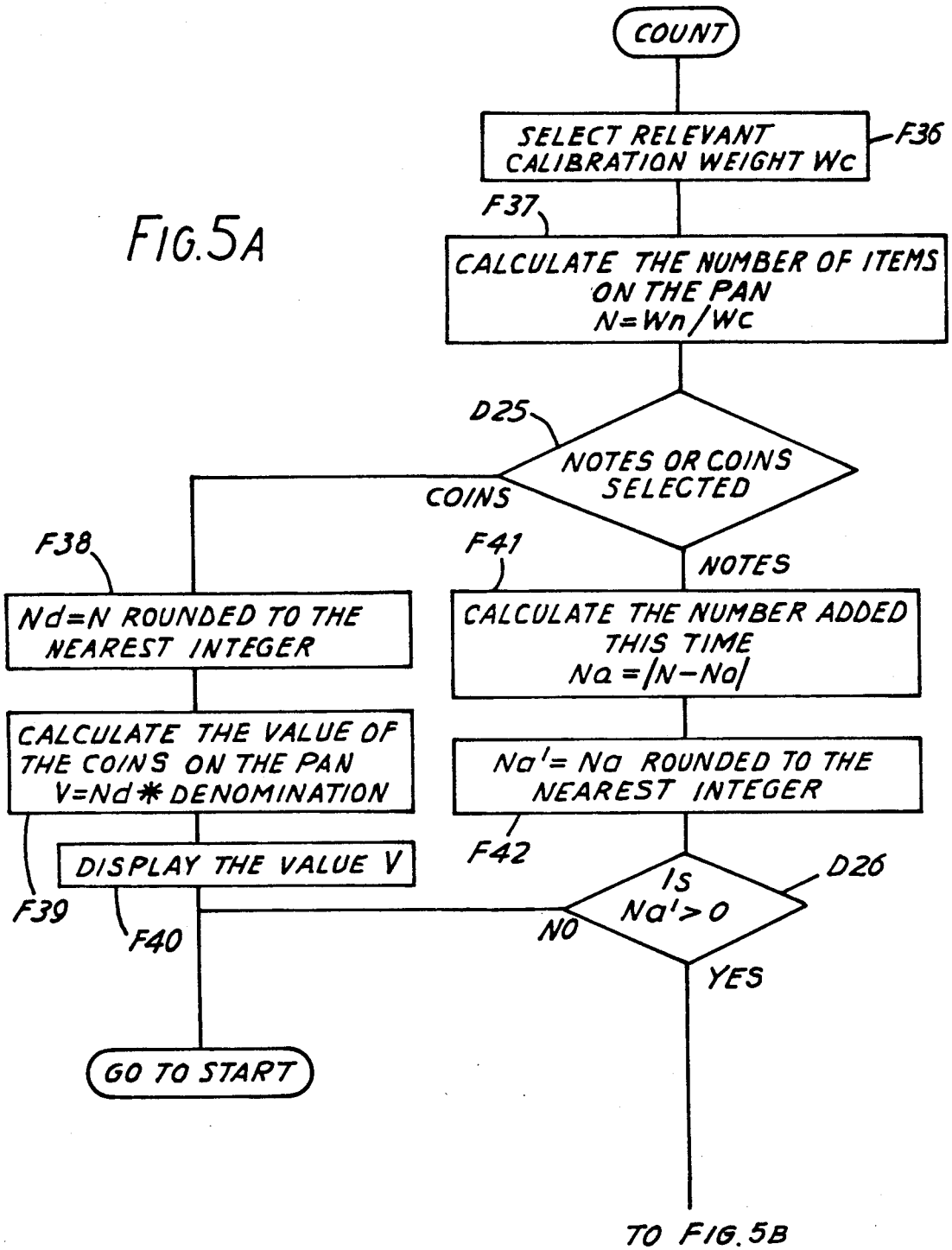
FIGS. 5A and 5B show a count routine of the weighing apparatus, and FIGS. 6A, 6B and 6C together show a flow diagram of a key handling routine of the weighing apparatus.
Figure 5B:
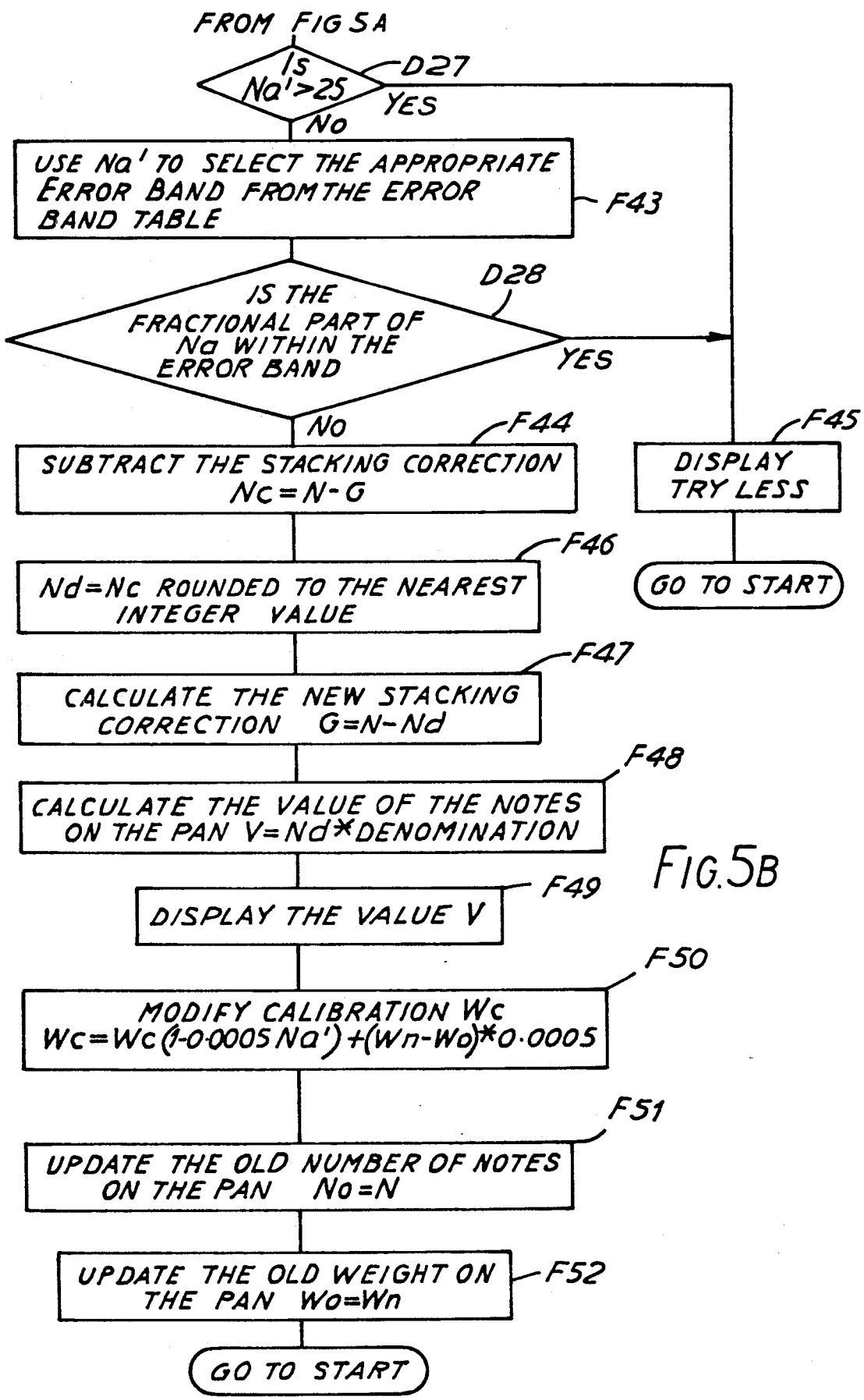

As will be apparent from the descriptions given above, the machine has a normal count routine by which it is able to determine the number of notes or coins of a selected denomination which have been placed on the platform 4. This count routine, which is illustrated in FIG. 5, enables the value of the items on the platform 4 to be determined whether the items are packaged or not. Function block F36 selects the weight Wc in RAM calibrated for the particular denomination which is being counted and then at block F37 the number of items on the platform 4 is determined by dividing the nett weight by the calibration weight, that is $$N = Wn \div Wc.$$

It will be appreciated that the nett weight Wn has already been determined at function block F3 or F4, depending upon whether tare has been selected, of the main weighing routine of FIG. 3.

Figure 6A:
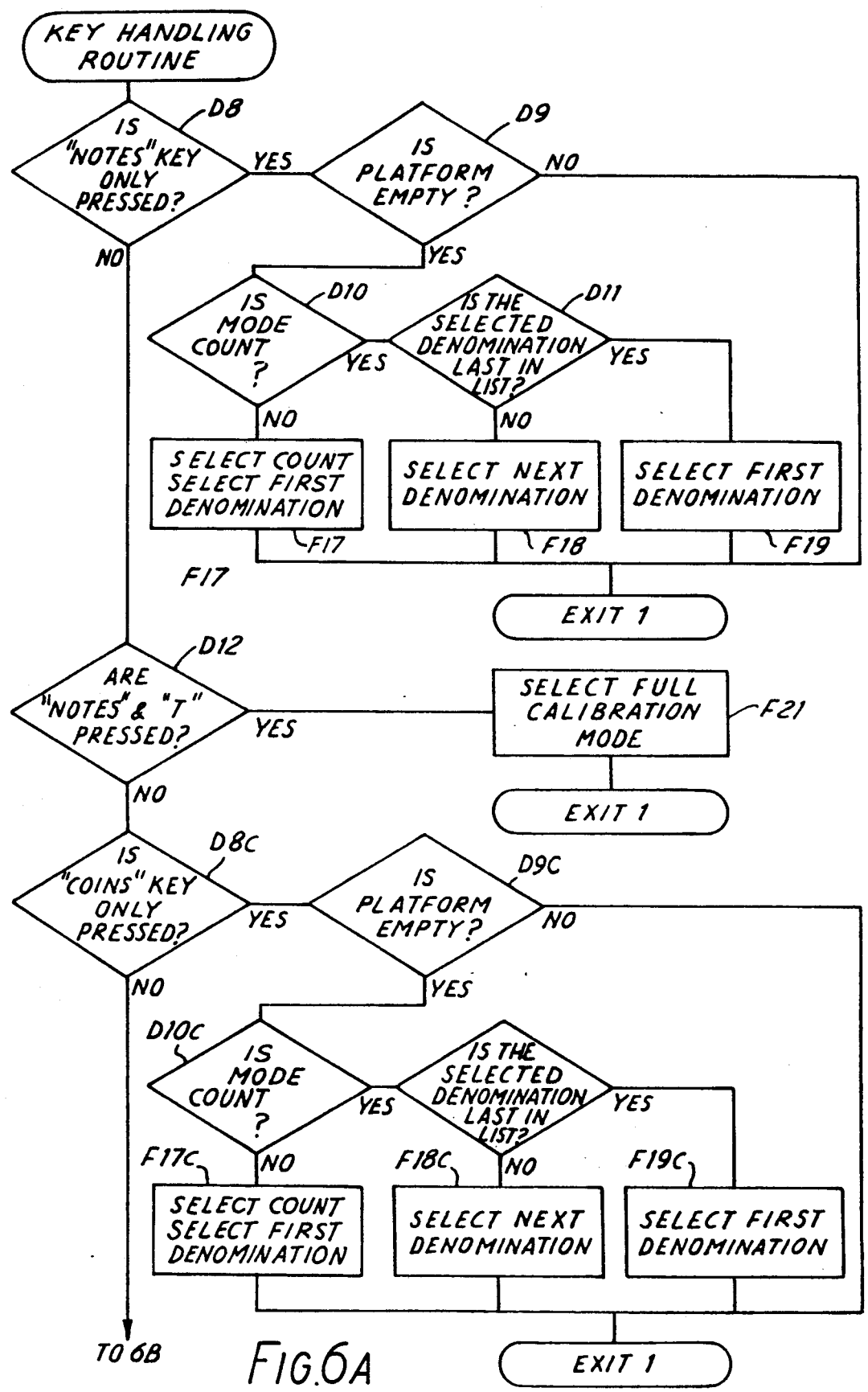
Figure 6B:
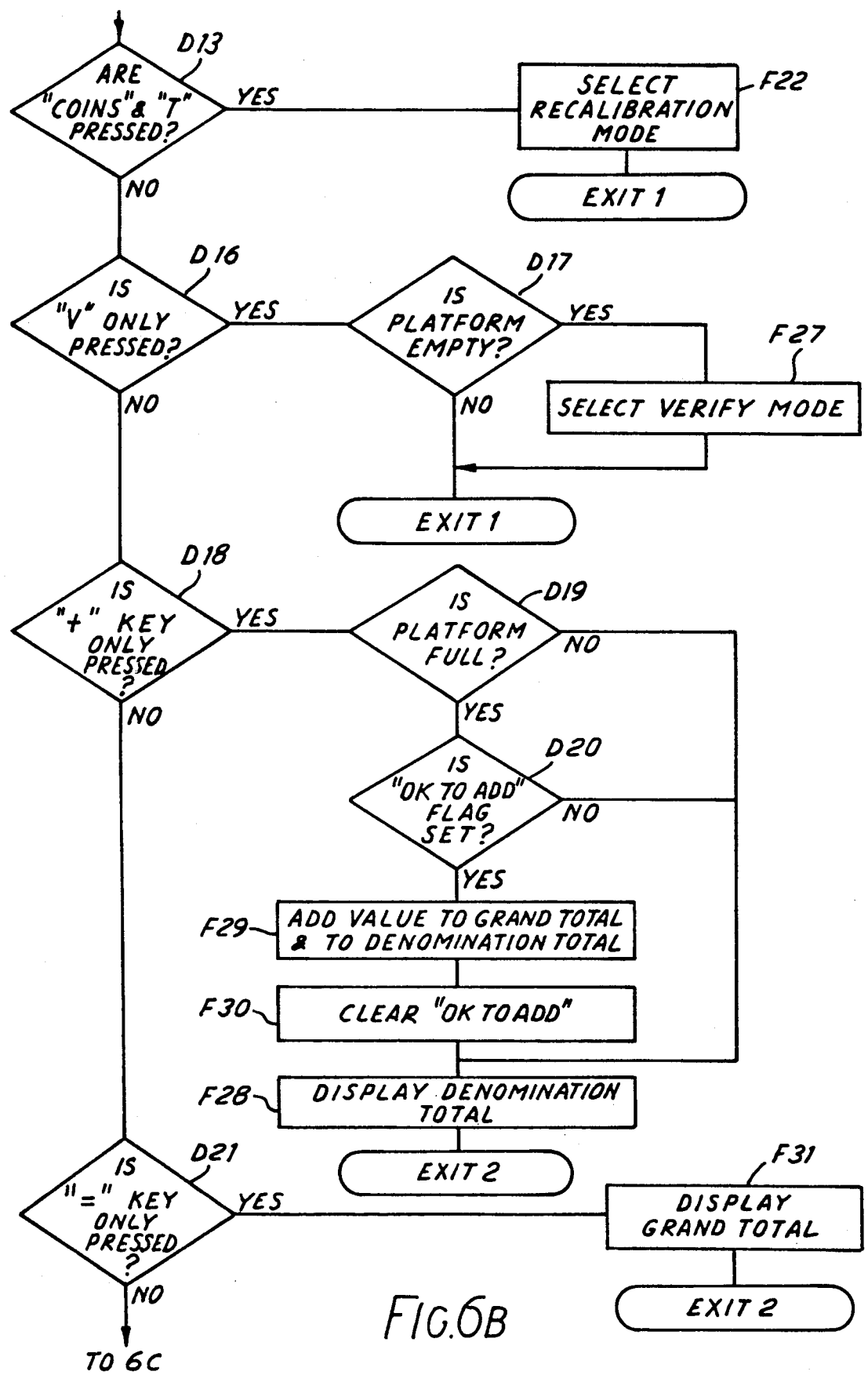
Figure 6C:
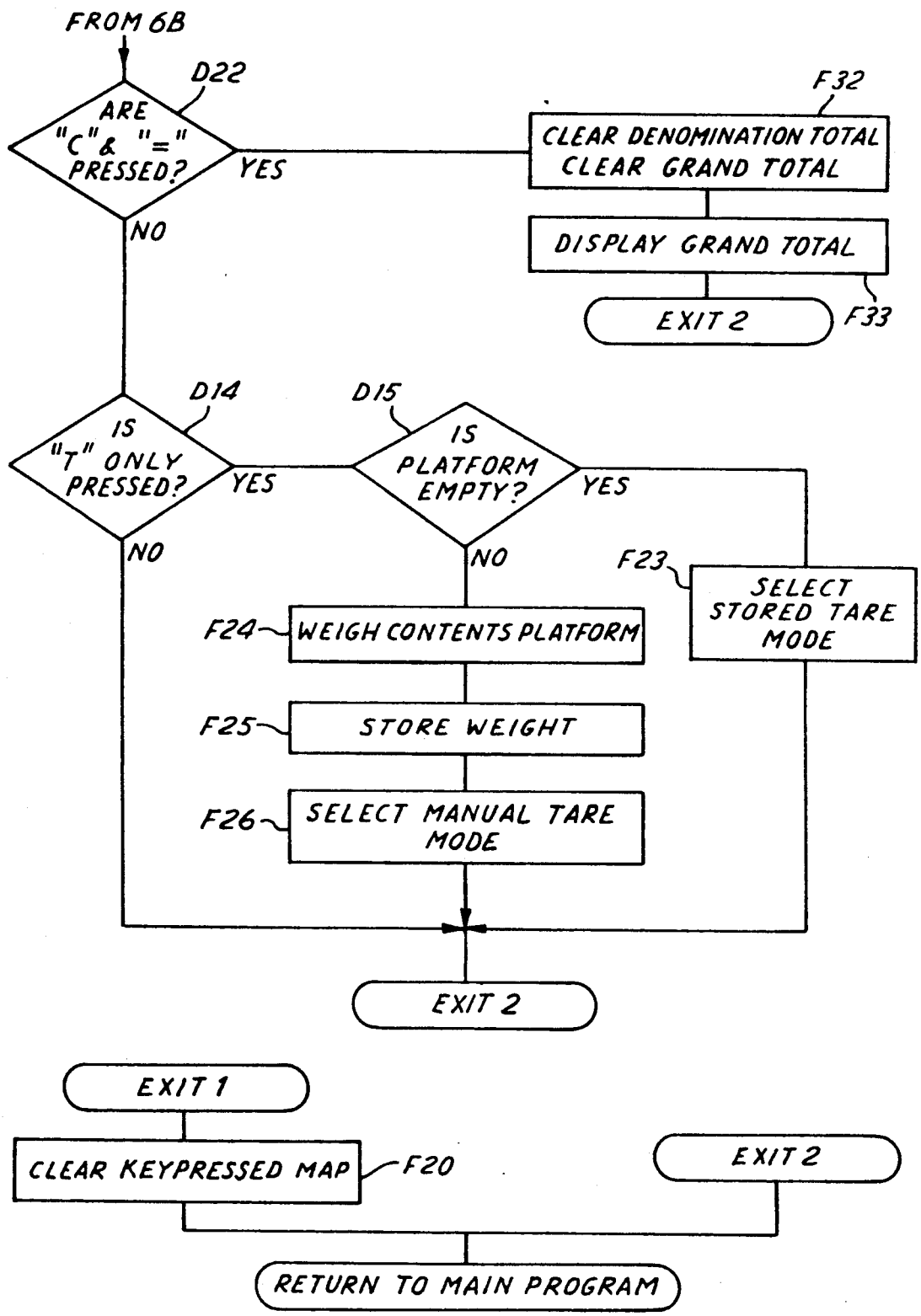

The routine then proceeds to block D25 to determine whether notes or coins are being counted. This, together with the denomination being counted, has already been selected by the operator, who has pressed either the "NOTES" key 10 or the "COINS" key 11 at the start of a weighing process. In this respect, if the key 10 is pressed with the platform 4 empty, the key handling routine, as is shown in FIG. 6A, by way of decision blocks D8, D9 and D10 will select the count mode and enter that selection in RAM. It will be seen that the block F17 of the key handling routine also selects the first denomination of notes in the list of denominations stored in RAM. The denomination so selected will be displayed on the panel 12. This routine then exits by way of "EXIT 1" and a function block F20, which clears the stored key map, to the main program.

If the denomination selected by the block F17 is the denomination in which it is required to count, a count routine can then be initiated simply by placing the notes to be counted on the platform 4. However, if the block F17 has selected a denomination which is not required, the "NOTES" key 10 is repeatedly pressed and released until the denomination required has been selected and is displayed. It will be appreciated that every time the key 10 is pressed with the count mode already selected, the decision block D10 of the key handling routine will cause by way of a decision block D11 and function blocks F18 and F19 the selection of a different denomination in the list. Each selected denomination is displayed and so the operator continues to press and release the key 10 until the appropriate denomination is displayed. The count routine can then be commenced by placing the notes on the platform 4.

The key handling routine includes an exactly analogous routine for selecting the count mode and the denomination when coins are to be counted. This routine is accessed by pressing only the key 11, labelled "COINS", as is indicated by the decision block D8c. The remaining decisions and functions of the coin count routine have been given references the same as those of the note count routine with the addition "c". Each decision or function block of the coin count routine performs exactly the same function or makes exactly the same decision as the corresponding block in the notes count routine.

Thus, at decision block D25 of the count routine, the program determines from the information stored in RAM as a result of the key handling routine whether notes or coins have been selected. If coins are being counted the routine passes to function block F38 where the calculated number N of items on the pan is rounded to the nearest integer Nd. For example, if N is calculated at block F37 to be 23.87, then Nd is set to 24. At the subsequent function block F39 the value V of the coins on the pan is calculated by multiplying the integer number Nd of coins on the pan by the denomination of those coins. For example, if the selected denomination is 20 pence coins, the value V will be 24×0.2 pounds, i.e. £4.80. Function block F40 then causes a suitable display of the determined value V, preferably with the selected denomination, to be made on the display panel 12. With the example given, the display might read "20p, £4.80". The routine then returns to the START of the main weighing routine of FIG. 3.

If at decision block D25 of the count routine it is determined that notes are being counted, the routine passes to block F41 where Na, the number Na of notes added this time is calculated. In this respect, Na is determined by subtracting from the number of notes N determined at block F37 as being on the pan a number No. This number No was the number of notes calculated at block F37 during the immediately preceding pass through the count routine and stored. Thus, $$Na = |N - No|$$

At function block F42 the number Na of notes added is rounded to the nearest integer Na'. At decision block D26 the routine determines if any notes have been added to the pan since the last pass through the routine by asking is Na' greater than zero? If Na' is equal to zero then no further notes have been added and the routine returns to the START of the main weighing routine of FIG. 3, and makes no changes to the display.

If notes have been added, Na' will be greater than zero. When this is determined at decision block D26, the routine moves onto decision block D27 which determines if the number of notes added exceeds a preselected maximum number. In the illustrated embodiment, this maximum number has been chosen to be twenty-five which has been found to represent a good compromise between the requirement of accepting as many notes as possible, and the requirement of not displaying an incorrect result. Other numbers can be chosen to produce differing compromises of the above requirements without affecting the procedure. If Na', the rounded number of notes added, is greater than 25 then a warning message TRY LESS is caused to be displayed at block F45 and the routine returns to the START of the main weighing routine of FIG. 3.

At this point it will be useful to provide an explanation of and examples behind the techniques used in the count routine for the weighing of notes. Generally, the number of notes being weighed is determined by forming a quotient, as N, by dividing a weight signal by an appropriate preset value, for example, the selected calibration weight Wc. However, the weight of individual notes will vary such that the resultant quotient will rarely be an exact integer. This is overcome by rounding, fractional parts of the quotient above 0.5 increasing the integer item count by one and fractional parts of the quotient under 0.5 being ignored.

It can easily be seen that if one item is placed on the pan any error of more the 50% of the item weight will produce a wrong result. If two items are placed on the equipment then an error of more than only 25% will produce a wrong result. Similarly for 5 items an error of more than 10% and for 50 items an error of more than 1% will produce a wrong result. Thus, the tolerance to error decreases as the number of items increases.

However, to prevent erroneous results, the quotient is compared with a set of error bands limits. For example, the limits might be set as +0.4/−0.4 such that any quotient having a fractional part less than or equal to 0.4 is rounded down, whereas any quotient having a fractional part equal to or greater than 0.6 is rounded up. If the fractional part is within the range set by the error band limits, that is greater than 0.4 but less than 0.6, no determination of the number of items is made and a warning message is displayed.

Assume that each item to be weighed has a calibrated weight of 10 grams, but an actual weight of 10.1 grams. In the case where error band limits of +0.4/−0.4 are used, the apparatus will count accurately up to 40 items (404 grams), indicate a warning between 40 and 60 items (404–606 grams) and then from 61 items upwards will be at least one item count in error.

If however the error band limits are decreased to +0.2/−0.2 the apparatus will count accurately up to 20 items (202 grams), indicate a warning between 20 and 80 items (202–808 grams) and then from 81 items upwards will be at least one item count in error. It will therefore be seen that the decreased limits reduce the chance of generating a wrong item count but that only 20 items may be accurately counted before the warning is invoked.

The present apparatus improves the situation by varying the limits at which the count quotient rounding ceases, and by displaying a warning automatically depending upon the number of items being counted. In general the width of the area where a warning is shown will be increased as the number of items being counted increases.

In the examples shown above the limits for acceptance would typically be set to +0.4/−0.4 of an item when 40 items or less are placed on the apparatus and then the error band limits would be narrowed in proportion to the increased item count; for example error band limits of +0.1/−0.1 of an item would be used when 90 items are placed on the apparatus.

It will also be clear from the above that for the utmost accuracy the total number of items added to the platform at any one time must be limited; this limit being determined by the maximum expected difference between the calibrated weight and the actual weight of the item. In the particular embodiment, this limit has been set at 25 notes as described above.

If it is determined at the decision block D27 that 25 or less notes have been added, the routine passes to function block F43 at which appropriate error band limits for the rounding are selected. In the particular embodiment illustrated, the rounded integer Na' is used to select a particular set of error band limits from an Error Band Table which is stored within the memory 32. As explained above, the error band limit range is generally decreased as the integer Na' increases.

Where memory capacity allows, it is particularly simple to provide a look up table of limits which relates the limits either to the number Na' of notes added, or relates the limits to the total count N. Alternatively, it could be arranged at function block F43 to calculate the limits using a function dependent upon Na, Na' or N.

At block D28 the fractional part of Na, the number of notes added, is compared with the limits determined at block F43. If the fractional part of Na is within the error band limits then the result is in error and is not acceptable and a warning message TRY LESS is arranged to be displayed by the block F45 and then the routine returns to the START of the main weighing routine of FIG. 3.

If at block D28 the fractional part of Na is outside the error band limits, the result is acceptable and the routine passes on to block F44 to commence a stacking error correction arranged to remove cumulative errors from the weighing of successive additions of notes.

The stacking error correction routine is similar to that described and illustrated in our UK patent No. 2076979 and removes the risks of errors occurring because the notes are being weighed in successive bundles. To explain the operation, assume that each item to be weighed has a calibrated weight of 10 grams, but an actual weight of 10.15 grams. A first bundle of 25 items will weigh 253.75 grams, and the resultant quotient N of 25.375 will be correctly rounded to 25. A second bundle of 25 items placed on the first will successfully meet the error band criteria of decision block D28, but the cumulative weight of 507.50 grams, and the resultant quotient of 50.75 would be incorrectly rounded to 51.

This sort of error is obviated by the stacking error correction routine. At function block F44 a stacking correction factor G is subtracted from the quotient N representing the total number of notes calculated at block F37. By this means a corrected number Nc of items on the pan is formed, where $$Nc = N - G.$$

Initially, as we saw in the main weighing routine of FIG. 3, the stacking correction factor G is zero.

The corrected number Nc is then rounded to the nearest integer Nd at function block F46. It will be appreciated that Nd represents the total number of items on the pan.

The routine next passes to function block F47 where a new stacking correction factor G is calculated as the difference between the corrected integer number of notes on the pan, Nd, and the calculated number N of notes on the pan from block F37.

$$i.e.\ G = N - Nd$$

The new stacking correction factor G having been stored, the routine passes to block F48 where the value V of the notes of the pan is calculated by multiplying the number of notes on the pan by their denomination. That is:

$$V = Nd$$

denomination. This calculated value V is then caused to be suitably displayed on the display panel 12 by way of function block F49. In this respect, the display could be of value only or of denomination and value, for example, the display could be "£5, £250".

The routine then performs an updating of the calibrated weight Wc, and the new value for Wc is stored in RAM in place of the old value. The updating is performed at function block F50 and is arranged to modify the calibration weight Wc of the selected denomination in such a way as to reduce the difference between the stored calibration weight Wc and the real average weight of the notes being counted. In the embodiment illustrated the new value for Wc is calculated according to the formula:

$$New\ Wc = \frac{Old\ Wc\ (1 - 0.0005 Na') + (Wn - Wo)}{0.0005}$$

Where Wn is the nett weight on the pan, and Wo is the old nett weight on the pan, that is the nett weight at the immediately preceding pass through the count routine of FIG. 5.

It will be seen that this formula takes account of the number of notes added each time as well as their average weight. The effect of thus modifying the calibration weight is to enable the machine to track slow changes in the average weight of the notes being counted. In this respect, it will be appreciated that it is important to continuously update the stored weight Wc for notes because notes can vary significantly in their weight depending upon whether they are old or new, if they have been damaged, or subject to humidity and the like. It would be possible to recalibrate the weight reading stored for the coins, but this is not generally necessary.

The formula shown at function block F50 for calculating the modified calibration value has been found to be particularly effective. However, alternative formulae can, of course, be utilised.

At block F51 the old number of notes on the pan, No, is updated to be the current number of notes on the pan and at block F52 the old weight on the pan, Wo, is updated to be the current weight on the pan and then the routine returns to the START of the main weighing routine shown in FIG. 3.

It will be appreciated that modifications of and variations in the present invention as described and illustrated may be made. For example, and as indicated above, the variation of the error band limits may be in dependence upon the rounded integer Na' or upon the current number N of items on the pan. It would also be possible to use the old number No or to use one of the weight signals such as Wn or Wo to determine the error band limits or any combination of these. It would also be possible to choose other parameters, or functions thereof, either alone and/or in combination with the weight signals and/or the number of items to determine the error band limits. Again, the chosen determinant could be used as a pointer to a look up table and/or a formula relating the limits to weight and/or the number of items could be chosen.

In the embodiment of the count routine given in FIG. 5 there is no check made on the quotient N representing the total number of items on the pan. Of course, it would be possible additionally and/or alternatively to check that the quotient N is acceptable. Thus, the fractional part of the quotient N could be compared, for example, at rounding at function block F46, with appropriate tolerance limits. Additionally, and/or alternatively a check could be made after function block F47 that the stacking correction factor G is within acceptable tolerance limits. A routine for performing such a check is disclosed in our UK patent No. 2076979. The limits for any or all of such checks could be determined in dependence upon chosen determinants as described above with reference to the error band limits for determining the acceptability of Na.

It will be appreciated that the provision of the functions described above through appropriate software will be within the ability of those skilled in the art and requires no detailed explanation.

Many modifications and variations of the invention as specifically described above may be made within the scope of the invention. In particular, the invention may be applied to the weighing and counting of items other than coins or notes. Furthermore, the apparatus may be arranged to perform routines other than those specifically described.

What is claimed is:

1. An apparatus for determining the number and/or value of weighed items, said apparatus comprising:
   storage means for storing calibrated values representative of parameters of weighed items and for storing tolerance limits for ensuring the accuracy of the determination to be carried out,
   processor means for receiving a weight signal representative of the weight of items being weighed during a determination and for selecting a calibrated value,
   wherein said processor means further comprises means for forming a quotient comprising means for dividing the weight signal received by the calibrated value selected, and means for comparing the quotient formed with said stored tolerance limits and determining if the quotient is within or outside the tolerance limits,
   wherein said apparatus further comprises means for varying said stored tolerance limits for the determination being carried out, the variation of said stored tolerance limits being dependent upon parameters of the items being weighed or upon parameters of the determination being carried out, and
   wherein said apparatus further comprises output means for signalling the result of the determination and signalling that the determination is acceptable when the quotient is within the varied tolerance limits and further signalling that the determination is unacceptable when the quotient is outside the varied tolerance limits.

2. An apparatus according to claim 1, wherein said means to vary said tolerance limits is arranged to vary said tolerance limits in dependence upon said weight signal, or said quotient or a function of said weight signal and said quotient.

3. An apparatus according to claim 1, wherein said selected calibrated value by which said weight signal is divided is a respective one of a plurality of stored calibrated weights such that an acceptable quotient is representative of the number of items in a weighed article, and said apparatus further comprising calibration means for adjusting said stored calibrated weights in dependence upon said weight signal.

4. An apparatus according to claim 3, wherein said means arranged to vary said stored tolerance limits is arranged to determine the tolerance limits in dependence upon the value of the integer of said quotient, and wherein said means for comparing is arranged to compare the fraction of the quotient with the determined tolerance limits.

5. An apparatus according to claim 3, wherein said means for forming a quotient further comprises means for subtracting a preselected value from the results of the division of the weight signal by the selected calibrated value to form the quotient to be compared with said varied tolerance limits.

6. An apparatus according to claim 5, wherein said subtracting means is arranged to subtract a preselected value representative of a previous number of items in a weighed article from the results of the division such that said quotient is representative only of the number of subsequently added items.

7. An apparatus according to claim 6, wherein said means arranged to vary said stored tolerance limits is arranged to increase the area of the tolerance limits in which the quotient is unacceptable as the value of the said quotient is increased.

8. An apparatus for determining the number and/or value of weighed items, said apparatus comprising:
   storage means for storing calibrated values representative of parameters of weighed items and for storing tolerance limits for ensuring the accuracy of the determination to be carried out,
   processor means for receiving a weight signal representative of the weight of items being weighed during a determination and for selecting a calibrated value,
   wherein said processor means further comprises means for forming a quotient comprising means for dividing the weight signal received by the calibrated value selected, and means for comparing the quotient formed with said stored tolerance limits and determining if the quotient is within or outside the tolerance limits,
   wherein said apparatus further comprises means for varying said stored tolerance limits for the determination being carried out, the variation of said stored tolerance limits being dependent upon parameters of the items being weighed or upon parameters of the determination being carried out, and wherein said apparatus further comprises output means for signalling the result of the determination and signalling that the determination is acceptable when the quotient is within the varied tolerance limits and further signalling that the determination is unacceptable when the quotient is outside the varied tolerance limits, and wherein said means to vary said tolerance limits is arranged to vary said tolerance limits depending upon said quotient.

9. An apparatus according to any one of claims 1, 2 or 8, wherein the selected calibrated value by which said weight signal is divided is a value representative of the number of individual items in a weighed article such that an acceptable quotient is representative of the weight of one or more of the individual items.

10. An apparatus according to any one of claims 1, 2 or 8, wherein said selected calibrated value by which said weight signal is divided is a respective one of a plurality of preset weights such that an acceptable quotient is representative of the number of items in a weighed article.

11. An apparatus for determining the number and/or value of weighed items comprising:
processor means for receiving a weight signal representative of the weight of items being weighed during a determination,
said processor means having means for forming a quotient including means for dividing said weight signal by a selected calibrated value, and means for comparing said quotient with tolerance limits,
output means for signalling that said quotient is within said tolerance limits and so acceptable or that said quotient is outside said tolerance limits and so unacceptable,
means for varying said tolerance limits for the determination being carried out in accordance with parameters of the items being weighed or upon parameters of the determination being carried out, and
calibration means for adjusting said stored calibrated values in dependence upon said weight signal.

12. An apparatus for determining the number and/or value of weighed items comprising:
processor means for receiving a weight signal representative of the weight of items being weighed during a determination,
said processor means having means for forming a quotient including means for dividing said weight signal by a selected calibrated value, and means for comparing said quotient with tolerance limits,
output means for signalling that said quotient is within said tolerance limits and so acceptable or that said quotient is outside said tolerance limits and so unacceptable,
means for varying said tolerance limits for the determination being carried out in accordance with parameters of the items being weighed or upon parameters of the determination being carried out, and
calibration means for adjusting said stored calibrated values in dependence upon said weight signal, and
wherein said means for varying said stored tolerance limits is arranged to increase the area of the tolerance limits in which the quotient is unacceptable as the value of the said quotient is increased,
wherein said means for varying said stored tolerance limits is arranged to determine the tolerance limits depending upon the value of the integer of said quotient, and
wherein said means for comparing is arranged to compare the fraction of the quotient with the determined tolerance limits.

13. An apparatus according to claim 12, wherein said means for forming a quotient further comprises:
means for subtracting a preselected value from the results of the division of the weight signal by the selected calibrated value to form the quotient to be compared with said tolerance limits, and
wherein said apparatus further comprises means for comparing said quotient with a predetermined quantity, said output means being arranged to signal a warning if said quotient exceeds said predetermined quantity.

14. A weighing apparatus for determining the number and/or value of weighed items, said weighing apparatus comprising:
means for producing a weight signal during a determination,
storage means for storing calibrated values representative of parameters of weighed items and for storing tolerance limits for ensuring the accuracy of the determination to be carried out, and
processor means for receiving said weight signal for selecting a calibrated value,
wherein said processor means further comprises means for forming a quotient comprising means for dividing the weight signal received by the calibrated value selected, and means for comparing the quotient formed with said stored tolerance limits and determining if the quotient is within or outside the tolerance limits,
wherein said apparatus further comprises means for varying said stored tolerance limits for the determination being carried out, the variation of said stored tolerance limits being dependent upon parameters of the items being weighed or upon parameters of the determination being carried out,
wherein said apparatus further comprises output means for signalling the result of the determination and signalling that the determination is acceptable when the quotient is within the varied tolerance limits, and
wherein means are provided for determining the number and/or value of the weighed items from an acceptable quotient.

15. A weighing apparatus according to claim 14, wherein said processor means comprises a microprocessor and said storage means is constituted by at least one memory.

16. A weighing apparatus according to claim 14, comprising a weighing platform for receiving items to be weighed, said means for producing a weight signal being coupled to said weighing platform so that said weight signal is representative of the weight of items on said platform, and input means to which said processor means is responsive to enable the selection of a weighing routine.

17. A weighing apparatus according to claim 16, wherein said input means comprises a keyboard, and wherein said output means comprises a display.

18. A weighing apparatus according to claim 14, wherein said means for producing the weight signal comprises weighing means for producing an actual measured weight.

19. A weighing apparatus according to claim 18, further comprising means for deducting a tare value from said actual measured weight to derive said weight signal.

20. A weighing apparatus according to claim 18, arranged to weigh items of different denominations, each denomination representing a different value, said weighing apparatus comprising storage means in which a list of denominations is stored together with the value assigned to each denomination, and a respective calibrated value for each denomination in said list.

21. A weighing apparatus according to claim 20, wherein the calibrated value stored in said storage means for each denomination in said list is representative of the weight of an individual one of the items of that denomination.

22. A weighing apparatus according to claim 20, wherein the calibrated value stored in said storage means for each denomination in said list is representative of the weight of a respective predetermined number of the items of that denomination.

23. A weighing apparatus according to claim 22, wherein said stored calibrated values are preset weights such that said quotient formed by said processor means is representative of the number of items being weighed, and wherein said processor means is arranged to be responsive to said output means signalling that said quotient is acceptable to enable multiplying means to multiply at least part of said quotient by the value assigned to said denomination whereby the value of the weighed items is determined.

24. A weighing apparatus according to claim 23, wherein when said quotient is acceptable an appropriate exact integer value therfor is formed, and it is said exact integer value which is multiplied by said multiplying means with said assigned value.

25. A weighing apparatus according to claim 23, further comprising calibration means for adjusting said stored preset weights, wherein said calibration means is arranged to adjust a preset weight in dependence upon said actual measured weight.

26. A weighing apparatus according to claim 22, wherein said stored calibrated values are preset weights such that said quotient formed by said processor means is representative of items being weighed, and wherein said processor means further comprises means arranged to correct said quotient in dependence upon a previously determined quotient.

27. A weighing apparatus according to claim 26, arranged to weigh items of different denominations, each denomination representing a different value, said weighing apparatus comprising storage means in which a list of denominations and the value assigned to each denomination is stored, and means for deriving from a weight signal the aggregate value of a group of items of the same denomination being weighed.

28. A weighing apparatus according to claim 27, further comprising means for storing said aggregate value and means for forming a cumulative total by adding to said stored aggregate value a second aggregate value derived from the weight signal produced by weighing a second group of items.

29. A method of determining the number and/or value of weighed items, the method comprising the steps of:
forming a quotient by steps including dividing a weight signal representative of the weight of items being weighed during a determination by a selected preset calibrated value,
comparing said quotient with tolerance limits wherein said tolerance limits are varied in dependence upon parameters of said items being weighed or upon parameters of said determination, and
signalling the quotient as acceptable if it is within said varied tolerance limits and as unacceptable if it is outside said varied tolerance limits.

30. A method according to claim 29, wherein said parameters are said weight signal, said quotient, or a function of said weight signal and said quotient.

31. A method according to claim 29, wherein said selected calibrated value represents the weight of one item of a respective denomination such that an acceptable quotient is representative of the number of items of that denomination being weighed.

32. A method according to claim 29, further comprising the steps of:
weighing the items to produce an actual measured weight,
deriving said weight signal from said actual measured weight,
storing a list of denominations of items,
storing for each denomination of item a respective preset weight and a respective assigned value,
forming said quotient and determining if it is acceptable and,
if said quotient is acceptable, determining from said quotient and said assigned value the value of said weighed items, and
displaying the value of the items so determined.

33. A method according to claim 32, wherein when said quotient is acceptable in appropriate exact integer value therefor is formed, and said exact integer value is multiplied with said assigned value to determine the value of the weighed items.

34. A method according to claim 32, further comprising storing a respective tare value for each denomination of item in said list, and deducting the tare value associated with a selected denomination from said actual measured weight to derive said weight signal.

35. A method according to claim 32, wherein said calibrated weight for each denomination in said list is representative of the weight of a respective predetermined number of the items of that denomination.

36. A method according to claim 35, wherein said calibrated weight for each denomination in said list is representative of the weight of an individual one of the items of that denomination.

37. A method according to claim 32, further comprising the step of adjusting the calibrated weight stored in respect of the denomination of items weighed.

38. A method according to claim 37, wherein the calibrated weight stored for the weighed denomination corresponds to the weight of an individual one of the items of that denomination, and wherein the stored calibrated weight is adjusted in dependence upon said weight signal.

* * * * *